(12) United States Patent
Johnson et al.

(10) Patent No.: US 9,098,503 B1
(45) Date of Patent: Aug. 4, 2015

(54) SUBSELECTION OF PORTIONS OF AN IMAGE REVIEW SEQUENCE USING SPATIAL OR OTHER SELECTORS

(75) Inventors: Michael B. Johnson, Oakland, CA (US); Yu-Chung Chen, Oakland, CA (US); Apurva Shah, San Mateo, CA (US); Michael Kass, Berkeley, CA (US)

(73) Assignee: PIXAR, Emeryville, CA (US)

( * ) Notice: Subject to any disclaimer, the term of this patent is extended or adjusted under 35 U.S.C. 154(b) by 814 days.

(21) Appl. No.: 13/267,765

(22) Filed: Oct. 6, 2011

(51) Int. Cl.
*G09G 5/00* (2006.01)
*G06F 17/20* (2006.01)
*G06F 17/30* (2006.01)

(52) U.S. Cl.
CPC .............................. *G06F 17/30017* (2013.01)

(58) Field of Classification Search
CPC ................................................ G06F 17/30017
See application file for complete search history.

(56) References Cited

U.S. PATENT DOCUMENTS

| | | | | |
|---|---|---|---|---|
| 5,600,775 | A * | 2/1997 | King et al. | 715/203 |
| 7,324,069 | B2 * | 1/2008 | Weber et al. | 345/2.2 |
| 2006/0079967 | A1 * | 4/2006 | Roby et al. | 700/17 |
| 2008/0165149 | A1 * | 7/2008 | Platzer et al. | 345/173 |
| 2008/0250452 | A1 * | 10/2008 | Iwamoto | 725/39 |
| 2009/0129596 | A1 * | 5/2009 | Chavez et al. | 380/277 |
| 2009/0265654 | A1 * | 10/2009 | Dieberger et al. | 715/772 |
| 2012/0066605 | A1 * | 3/2012 | Dieberger et al. | 715/735 |

OTHER PUBLICATIONS

Fisher, Danyel. "Hotmap: Looking at geographic attention." Visualization and Computer Graphics, IEEE Transactions on 13.6 (2007): 1184-1191.*
Wilkinson, Leland and Michael Friendly, "The History of the Cluster Heat Map", American Statistical Association, (May 2009), vol. 63, No. 2, pp. 179-184. DOI: 10.1198/tas.2009.0033.
Wilkinson, Leland and Michael Friendly, "The History of the Cluster Heat Map", Unpublished (Nov. 18, 2008), 11 pages.

* cited by examiner

*Primary Examiner* — Zhengxi Liu
(74) *Attorney, Agent, or Firm* — Kilpatrick Townsend & Stockton, LLP.

(57) ABSTRACT

An image review system presents an image to a reviewer and records reviewer feedback, including reviewer position indicators relating to portions of the image and reviewer commentary data, which can be audio, visual, textual, etc. The reviewer position indicators and reviewer commentary data each have a time component, corresponding to when the reviewer indicated a position on the image and when the reviewer provided the commentary, respectively. During playback, the viewer can select a subset of the image of interest and get a playback of the reviewer commentary data that corresponds to the times represented by the reviewer position indicators that fall within the selected subset of the image. The reviewer position indicators can be collectively indicated by a heat map that, when laid over the image, indicates which portions of the image are commented on and how much time is spent there.

19 Claims, 4 Drawing Sheets

SUBSELECTION OF PORTIONS OF AN IMAGE REVIEW SEQUENCE USING SPATIAL OR OTHER SELECTORS

FIELD OF THE INVENTION

The present invention relates to visual presentation systems in general and in particular to visual presentation systems that handle images and review commentary associated with those images, whether they are comments on one image or a sequence of images.

BACKGROUND

The pre-production stages of animated filmmaking vary from one movie to another, but it generally involves development, storing, art and production management. In various stages, iterative reviewing and editing might be required, and they might be specialized review. For example, one artist might focus on lighting, while another artist focuses on the appearance of hair and fur, while yet another focuses on facial expressions. As should be apparent, if the artist focusing on facial expressions has to repeatedly scroll through commentary related to hair and landscape or other comments not part of that artist's responsibility or focus, the reviewing process can be time-consuming or even tedious.

A video sequence comprises a series of frames (images) designed to be played in order. A video sequence might or might not have a corresponding audio portion that is played in sync with the video sequence. Images (whether individual images or frames of video) might be reviewed and commented on by a production supervisor, director, etc. and the comments provided to an artist, technician, etc. for handling. In some cases, the production supervisor might review many different aspects of the image and provide comments to different artists.

The supervisor can review different aspects separately and provide separate comments to each artist. For example, the supervisor might draw comments on a copy of the image to provide feedback to one artist, draw comments on another copy for another artist and record audio comments for yet another artist. In some cases, because of the number of people required to make a feature length film, one person might be a reviewer who provides comments on specific portions of the film with a different person being the person who reviews the comments and makes edits. The reviewer might not want to be tied to making comments separately for each artist or destination of the comments, and might not even know how the work is to be divided when making the review comments. Therefore, flexible editing tools are often required.

One such review tool that is known is Pixar's "Review Sketch" review tool, aspects of which are described in [Weber2008] and [Wolff]. The review tool includes software that provides an intuitive interface for supervisors, such as film directors, to annotate video streams and/or images where the annotations are stored as an additional "comment" layer that can be overlaid on top of the video streams and/or images. Artists then can use the multi-layer images to modify and continue their work. As explained in [Weber2000], sometimes the review tool helped the reviewing process, but different reviewers might have different comment input preferences. Some reviewers tend to prefer just pointing to elements on the image and speaking about changes required, instead of sketching. One artist might be a good note-taker in a co-located review session. Others might miss reviewer's comment details in a fast-paced production schedule. With larger teams that might not all be geographically close, a bare visual representation of the final review could introduce ambiguity. Some comments might not be addressed with the drawing itself. One work-around is to have assistants transcribing reviewer notes, but that leads to delays and often leads to a cumbersome workflow.

In the filmmaking process, a supervisor reviews the visual data being created, such as stills of video, and provides feedback. This commentary can be conveyed in many ways. Different types of directorial suggestions may use different means of expression. For example, a suggestion about the "mood" of a character might be described by physical acting or by verbal description, but this is often not convenient if the artist who is to make the changes and the director are not in the same place. The director might record a video commentary or an audio commentary, which the artist can play back or watch.

In some cases, the feedback includes pointers to specific areas of an image. For example, a director might provide the feedback "Move the character's arms out further, to her, for better effect" and have that comment indicating by drawing on the image.

Methods and systems for reviewing should be simple and intuitive, because often reviewers are extremely busy and do not have time to learn how to use computers or learn how to use complicated software. The annotation methods and tools should be fast, lightweight, and fit into an existing review workflow, if necessary. However, they also need to be flexible in allowing a reviewer to review many different topics that might go to multiple people for handling. The annotation logistics should be simple and the annotation tools should be compatible with different types of visual signals. For example, in computer animation, work to be reviewed is sometimes reviewed from digital video, the artist's computer screen, or other source.

A simple approach for a director or other reviewer to give animators visual feedback is to have an image to be projected on a screen, provide the director a laser pointer or other pointer to allow for pointing to problem areas of the image, and have someone take notes as to where the director is pointing. "Whiteboarding" techniques could be used to electronically capture the pointing, but still requires some structuring of the comments ahead of time.

Another approach is to annotate an information stream wherein the reviewer drafts draft textual or graphic notes while viewing a video clip, and have a system record a timestamp in the video clip the moment the note was created. This technique has also been used with specialized pens that record on specialized paper markings, while simultaneously recording what the user wrote and heard. Subsequently, when the notes are reviewed, using the time stamp, the appropriate place in the video clip is located.

Some of these techniques include many significant drawbacks. One drawback is that it imposes a strictly linear notation strategy on the review process. In other words, the director would have to annotate the video as it were being shown.

Accordingly, what is desired are improved methods and apparatus addressing the drawbacks discussed above.

REFERENCES

[Johnson] Johnson, J. D., et al., *Audio vs. Video—The Same or Different? Highlights the Differences between Audio and Video Perception*, Audio Engineering Society—Pacific Northwest Section (2006).

[Weber2000] Weber, K., et al. 2000, *Interaction design at Pixar Animation Studios*, in CHI '00 Extended Abstracts on Human Factors in Computing Systems (The Hague, The Netherlands, Apr. 1-06, 2000).

[Weber2008] Weber, K., et al., Animation Review Methods and Apparatus, U.S. Pat. No. 7,324,069 (Jan. 29, 2008).

[Wolff] Wolff, E., et al., *Tool Time at Pixar, Sketching* The Incredibles, Digital Content Producer (Nov. 1, 2004) (available via HTTP from domain digitalcontentproducer-.com at the path/dcc/revfeat/video_tool_time_pixar/).

[Wilkinson] Wilkinson, L., et al., *The History of the Cluster Heat Map*, The American Statistician, vol. 63, No. 2, pp. 179-184 (May 1, 2009) [doi:10.1198/tas.2009.0033].

BRIEF SUMMARY OF THE INVENTION

An image review system presents an image to a reviewer and records reviewer feedback, including reviewer position indicators relating to portions of the image and reviewer commentary data, which can be audio, visual, textual, etc. The reviewer position indicators and reviewer commentary data each have a time component, corresponding to when the reviewer indicated a position on the image and when the reviewer provided the commentary, respectively. During playback, the viewer can select a subset of the image of interest and get a playback of the reviewer commentary data that corresponds to the times represented by the reviewer position indicators that fall within the selected subset of the image. The reviewer position indicators can be collectively indicated by a heat map that, when laid over the image, indicates which portions of the image are commented on and how much time is spent there.

In specific embodiments, the reviewer uses a pointer that generates a point on the image—the reviewer position indicators would then correspond to points on the image—and the system records where the indicator is at various times that reviewer commentary data (audio, drawing, video, etc.) is being recorded. A user of the system can then replay portions of the commentary data by selecting a subset of the image and getting the commentary data associated with those portions of the image. The pointer can be a mouse, stylus, finger, laser pointer, etc. usable to point to locations on the image, select grid cells, encircle regions of areas of the image, and/or the like. The system can record both the reviewer position indicators and the audio narration (or other reviewer commentary data) stream at the same time, possibly as separate tracks. A playback module can browse the recorded review session, so artists and others can receive reviewer feedback efficiently.

The following detailed description together with the accompanying drawings will provide a better understanding of the nature and advantages of the present invention.

DETAILED DESCRIPTION OF THE INVENTION

An improved visual presentation system that handles images and provides for review commentary associated with those images is described herein. In a specific use case, a reviewer is presented with an image to review and the reviewer points to points, grid squares, and/or objects on the image (stored as "reviewer position indicators") and records audio comments (and/or other types of "reviewer commentary data") that presumably relate to the pointed-to points, grid squares, and/or objects. The reviewer might be an animation supervisor or director and be tasked with reviewing many aspects of the image, wherein the comments are directed to multiple artists or others that might be known or unknown to the reviewer. Then, when a plurality of respondents (artists, etc.) that receive the recorded commentary and image go to play back the audio or other commentary, they can see a heat map (or other two-dimensional histogram) of the reviewer position indicators, which would indicate what portions of the image the reviewer spent the most time on. If a respondent is tasked with responding to the commentary for a specific portion of the image, the respondent can select a subset of the image (e.g., select one or more grid locations, select objects that have predefined or at least definable boundaries, draw a closed curve of nonzero area, etc.) and have the reviewer commentary data filtered so that the playback is only of the reviewer commentary data corresponding to the selected subset of the image. The correspondence between a subset of the image and specific reviewer commentary data because the reviewer commentary data has timestamps or other time value—such as a known time offset from some starting point—and the reviewer position indicators relate time and positions on the image.

This system can be used for a film pre-production pipeline wherein the images are frames of video, concept art, storyboard images, or the like. Reviewers can use the system to verbally comment and point over imagery elements during presentations. The system can record and playback synchronously both pointer locations and audio narration throughout a review session. There are both spatial and temporal components in each review session. The spatial-temporal playback navigation can use the heat map or just user selection.

Using the approaches described herein, a user can see the heat map visualization of reviewer activity and easily select areas of interest on the image, where the system uses the heat map information to filter the temporal data. The system record both interaction history and the audio narration (and other) stream at the same time, so that the respondent to a review can browsing a review session and get all relevant feedback as if he/she was sitting right next to the reviewer during a review session. Various types of maps can be used, so long as they present data in a corresponding coordinate system.

Example Hardware

Figure 1:
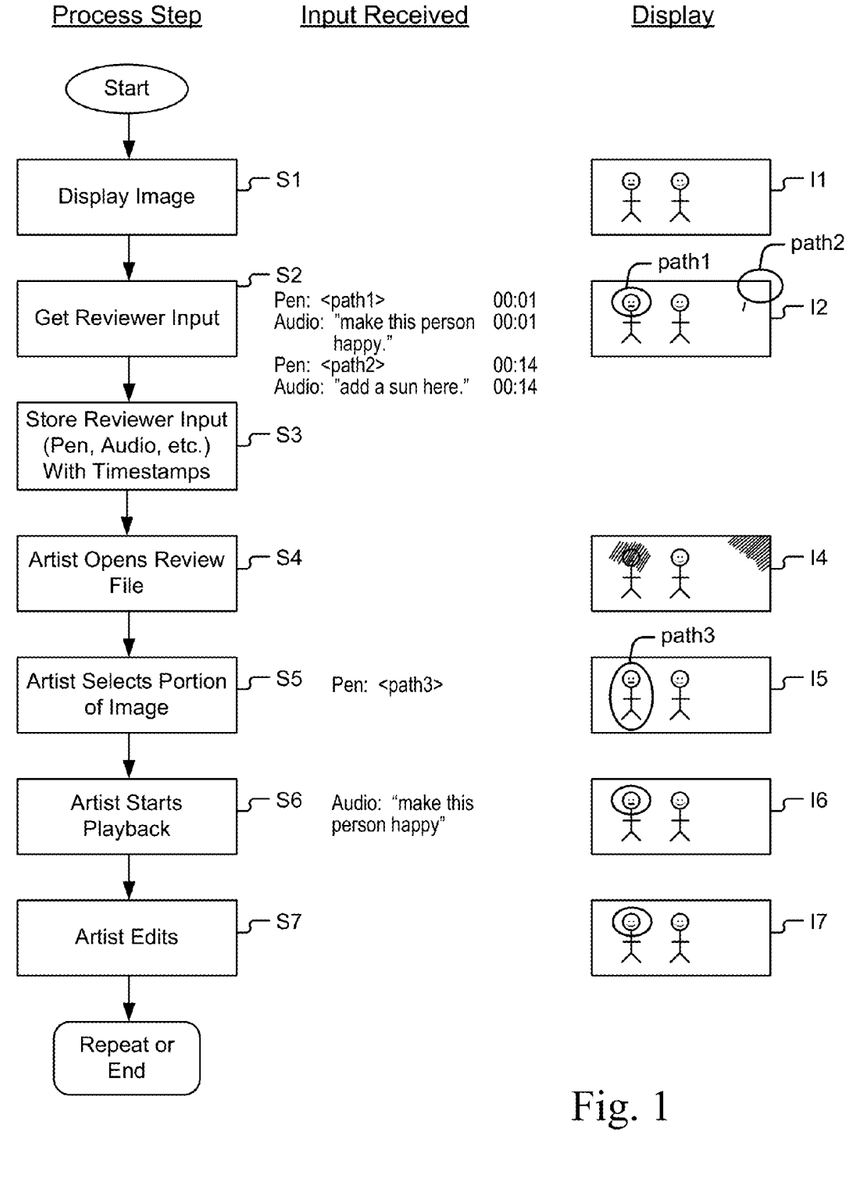
FIG. 1 illustrates an example flow of a process and interaction of a review system according to embodiments of the present invention.

FIG. 1 illustrates an example flow of a process and interaction of a review system. The process starts with the reviewer, when the system displays an image (step S1; the corresponding image is labeled "I1". The reviewer then provides input, at step S2 in this example by circling one region of the image (along path 1) and saying "Make this person happy" and circling another region of the image (along path 2) and saying "Add a sun here" as illustrated as image I2. Once the reviewer has completed a review, the audio and pen inputs are stored, possibly along with a copy of the image (step S3).

Later, when an artist or other respondent takes up the review to consider it and respond to the review (step S4), the artist sees a display (image I4) that indicates where the reviews occurred on the image. As indicated in image I4, there are two areas of review shown as shaded regions. Of course, it an actual review recording, there are likely to be more areas covered by the review. Then, in step S5, the artist provides input as to the subset of the image of interest (i.e., path 3 is input) and that might be shown in image I5. In this example, this particular artist is in charge of the personality of the character on the left and is not in charge of environmental effects (such as the sun, sky, etc.) and so the artist only selects the heat map shading around the character on the left.

The artist then starts the review playback (step S6) and hears the instructions to change the character on the left in image I6, not the instructions about the sun. The system can do this filtering by considering what subset the artist selected (the closed region defined by path 3), identified which reviewer position indicators were stored with the review (which in this example are path 1 and path 2) and the times that the reviewer made those indicators, and plays the audio comments (and/or other types of "reviewer commentary data") that correspond in time with the reviewer position indicators that overlap in space with the selected subset made by the artist. In some implementations, the artist might be able to simply click on the character on the left to select an outline of that character (or a slightly widened outline of the character so as to allow the reviewer to "draw outside the lines" and not have the artist miss comments just because the reviewer was not precise enough).

The artist can then provide edits (step S7, image I7).

Figure 2:
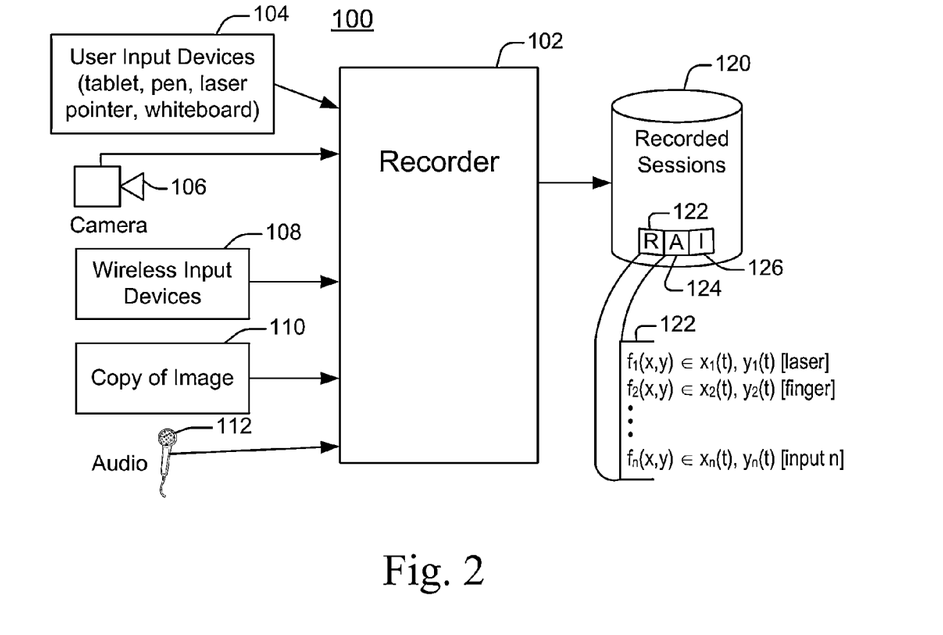
FIG. 2 illustrates example hardware that might be used for a review system according to embodiments of the present invention.

FIG. 2 illustrates example hardware that might be used for a review system. As illustrated there, a reviewing system 100 has a recorder 102 that accepts inputs from input devices 104, possibly also a camera 106, and wireless input devices 108, as well as a copy of the image being reviewed 110 and audio review commentary from microphone 112. It should be understood that many elements herein can be implemented in hardware, software that is read from computer readable media and comprises instructions that are executed by a processor and that many of the data elements used by the system can be stored in one or more memory units, such as RAM and ROM.

In a specific example, the user input devices include a Wacom™ Cintiq™ tablet/screen with a pressure-sensitive stylus and the software executes on a desktop computer, such as an Apple Macintosh running MacOS X, to handle the review recording and playback. A web-based recording plug-in for a browser might be used, as well as HTML5 playback pages. In other implementations, the input device might be an integrated tablet that allows for finger input of points and also records audio and displays images, such as the iPad™ tablet available from Apple, Inc.

Recorder 102 records review sessions in storage 120, where a stored review session includes an array 122 of reviewer position information, $f_i$, for each input device used. The reviewer position information might be stored as a series of locations (e.g., x and y positions for a series of time samples) of the inputs. The session might also include a recorded audio file 124 and a copy 126 of the image that was reviewed. In some instances, the review is of a plurality of related images, such as a short video sequence.

Recording

Most screencast tools record whole-screen activities as a single video file. This will produce a much larger file than required for an image review system, since most content will be static and valuable information, such as user interaction, will be embedded inside the video stream that becomes more difficult to analyze. In preferred embodiments, the image, interaction events and the audio recording are stored as separated, or easily separable, entities for each review session. This can be stored as a unit, a "bundled review" file. In a specific format for a bundled review file, audio narration is saved as an audio file encoded with an Advanced Audio Coding ("AAC") codec at 64 kilobits per second per channel and input events are sampled around 100 samples/second and saved into in a separated motion file (e.g., array 122) with each sample time-stamped using the current time code from the audio recording stream as suggested by [Johnson]. An additional information stub with metadata like original image source location and image name can also be attached in the bundled review file.

Playback: Audio-Visual Synchronization

As described above, the motion data and the audio narration can be recorded and saved separately during recording. In such cases, it is important to have the audio stream and any visual rendering of reviewer position indicators to be sufficiently well synchronized during playback to avoid confusing the respondents. A visual playback frame rate might be set to 24 frames per second.

Figure 3:
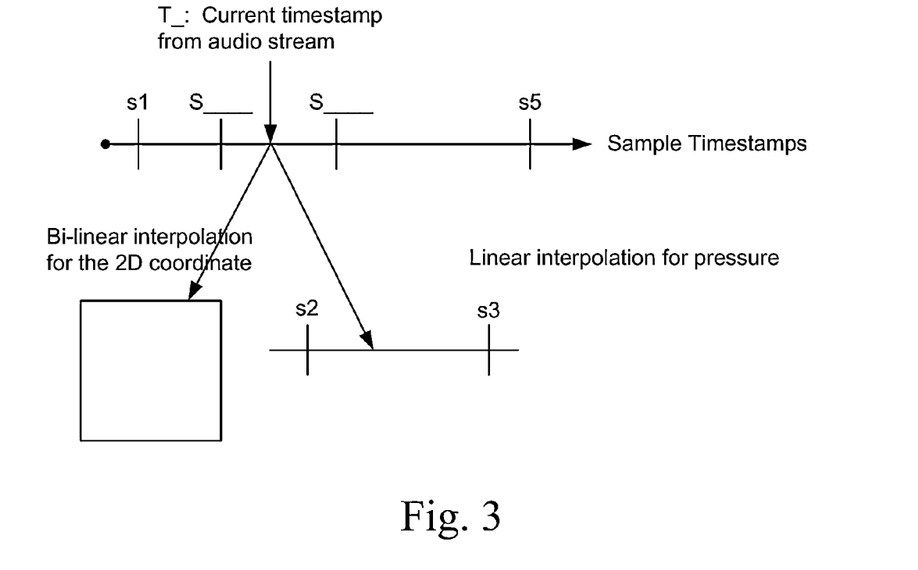
FIG. 3 illustrates timestamp matching.

If accurate pointer positions, stylus pressure values and event types are needed, a playback process might get a current time code from the audio stream during playback, search within the discrete motion event history for the closest upper and lower bound timestamps that enclose the retrieved time code (because there might not be any input reviewer pointing happening at the exact time of the audio for all audio times). This is illustrated in FIG. 3. The process would then use timestamps found in the discrete motion event history to retrieve lower and upper bounds' motion positions, pressure and event type values and interpolate current motion position, pressure and event type values using the timestamps and the retrieved values.

Figure 4:
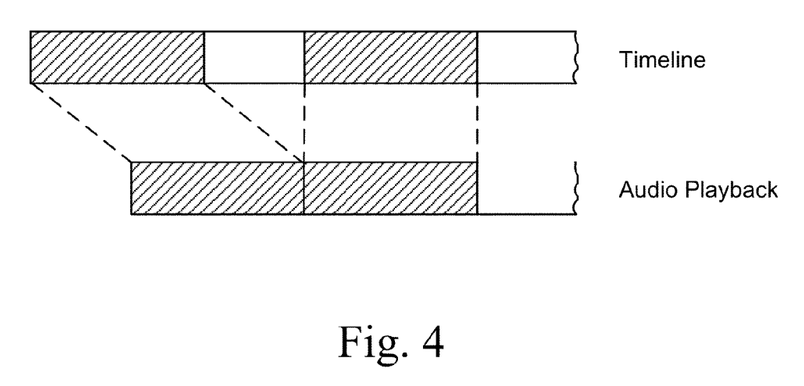
FIG. 4 illustrates filtering audio playback based on reviewer commentary data and reviewer position indicators.

FIG. 4 illustrates how the audio playback would be filtered from the recorded audio.

Heat Map Generation

Figure 5:
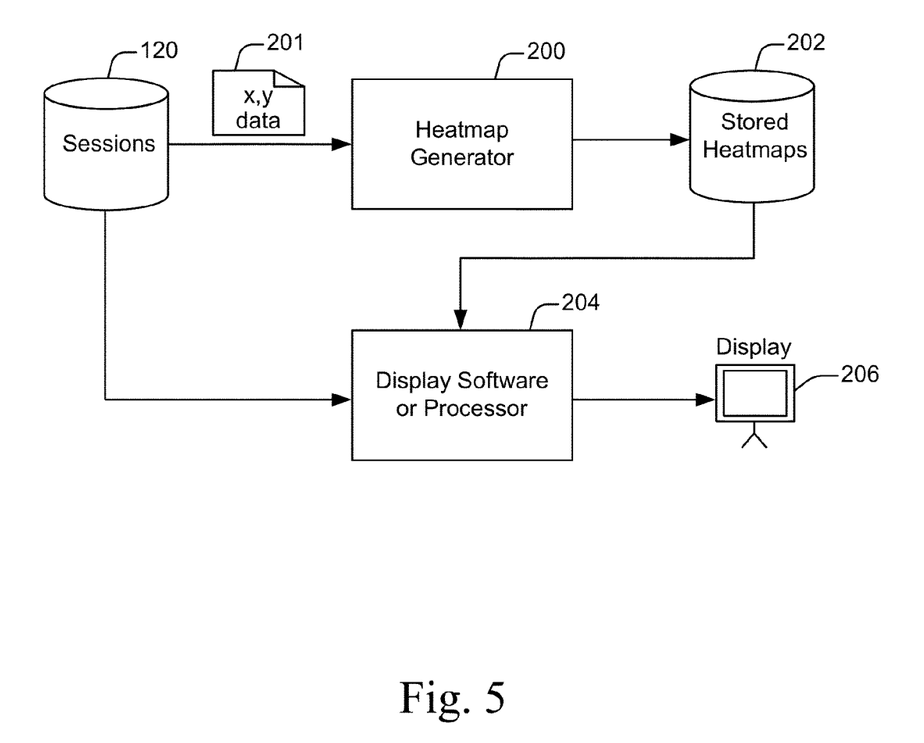
FIG. 5 illustrates a heat map generator.
Figure 6:
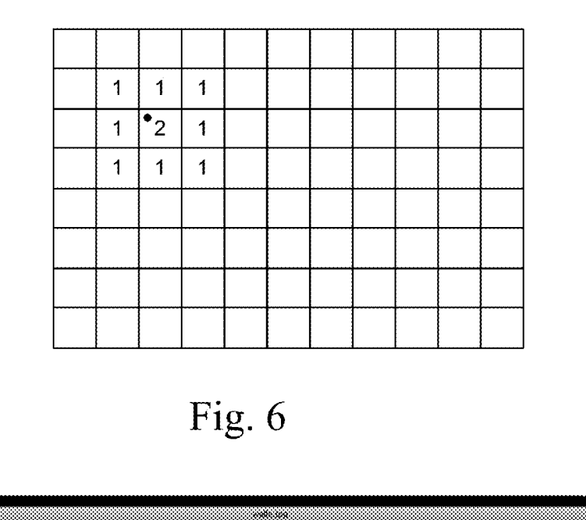
FIG. 6 illustrates a grid used for creating a heat map.

Heat map generation is illustrated with FIGS. 5 and 6.

As shown in FIG. 5, a heat map generator 200 can read (x,y) data from recorded sessions to generate stored heat maps 202 that can be used by a display processor or software 204 to present a heat map overlaid on an image on display 206. A process performed by heat map generator 200 will now be explained with reference to FIG. 6, with the understanding that heat map generator 200 has in memory or other access storage for a grid array, the image and other elements.

For a review image, heat map generator 200 generates a regular grid based on the image dimension and a user-adjustable grid size. It then identifies a grid cell coordinate using the x and y position in each pointer motion event data. Two bookkeeping steps will happen next. First, the tuple will first be added to a list of the grid cell for navigation reference described below, and then a 3×3 mask (see FIG. 6) is used to calculate and accumulate a weighted "heat value" for the grid cell and the eight surrounding cells. In this example, the weight is two for the center, one for the eight adjacent cells and zero everywhere else, but other filter windows can be used.

After processing all tuples, heat map generator 200 can derive a two-dimensional scalar grid and store that. A stepwise scalar-to-color map can be generated to render the color of each grid cell as an additional layer over the original image. Using the heat map overlay, users can see a rough overall history trace of the pointer movements and can also easily see where the potential important "hot zones" are that receive the most pointer movements.

Figure 7:
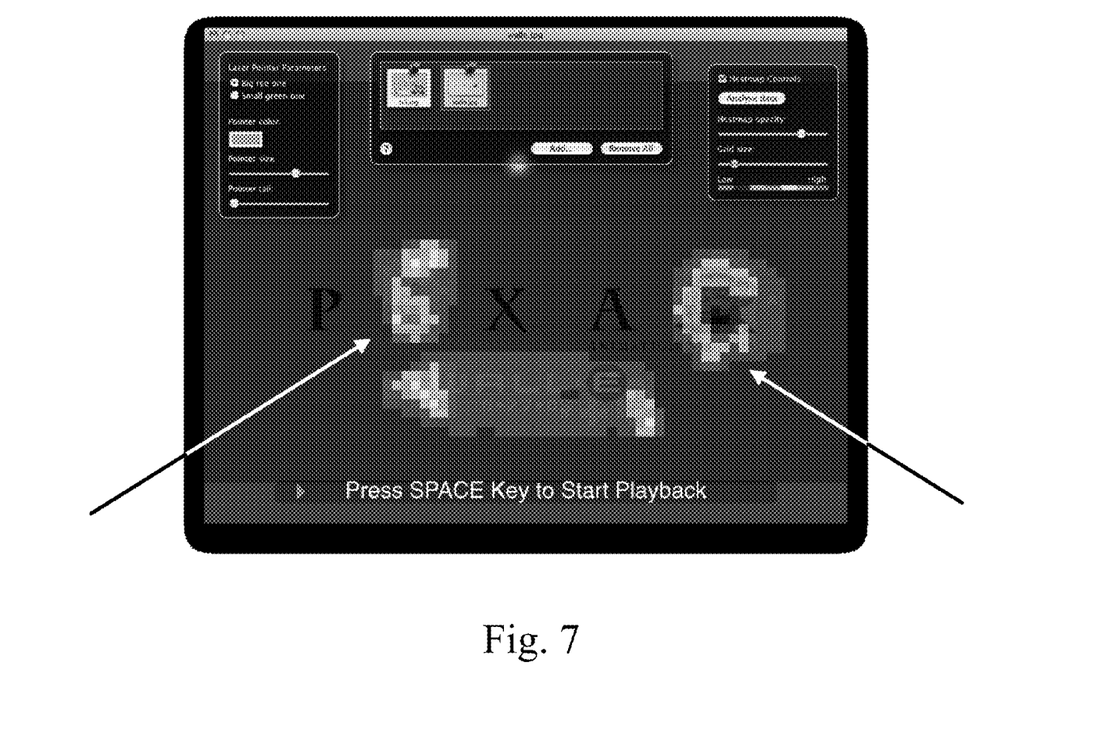
FIG. 7 illustrates a display of a heat map for reviewer inputs.

FIG. 7 illustrates an overlay of a heat map onto an image. This example might be a basic implementation, wherein each grid of the heat map has a color that encodes for the number of instances where the reviewer selected a point in that grid. For example, blue might be used for 1-3 instances, green for 4-6 instances, yellow for 7-9 instances, . . . , and red for 20 or more instances. It may be that instead of counting distinct instances, as might make sense if the reviewer taps points on the image, the counting is of the time periods that the reviewer dwells on a point or a grid cell. As an example, the heat map might use blue when the reviewer occupied (i.e., pointed to or otherwise indicated a reviewer position) the grid cell for between 0.1 and 3 seconds (uncolored/clear if occupied for zero seconds), green for 3.0 to 6.0 seconds of occupation, yellow for 6.0 to 9.8 seconds, . . . , and red for 30 seconds or more instances, and so on.

In some more complex implementations, not all reviewer position indicators are given equal weight. In the above example, if the reviewer spent 4 seconds discussing image features in grid cell C1 and 4 seconds discussing image features in grid cell C2, the corresponding grid cells in the heat map would be the same shade of green. In a more complex implementation, focus might be more intense for some portions of the review than others. For example, a reviewer's 4 second comments on grid cell C1 ("Oh, this building here looks nice and the light reflects well.") and reviewer's 4 second comments on grid cell C2 ("The dog right here does not look right at all—have someone fix the hair and get rid of the distracting artifacts!") might justify different weights and so the comments on grid cell C2 might be given the same weight as 20 seconds worth of review of grid cell C1.

Thus, while every mention could be weighted equally, sometimes the reviewer might want some mentions to be weighted more than others. The weight might be determined indirectly by some factor of the inputs, such as by the pressure applied with a pressure-sensitive stylus, the speed of the movement of the reviewer indicator, the volume of the reviewer's voice, etc. The weight might also be determined (with or without indirect inputs) with explicit reviewer inputs, such as where the reviewer is given a "dimmer switch" input for the laser pointer, or has some other indicator, or where the reviewing system understands gestures. Example gestures might be "+" or "*" to indicate the reviewers desire to increase the relative weight of comments.

In some cases, weighting is influenced by reviewer sentiment, wherein comments that have a negative or corrective sentiment are weighted more than comments that have a positive or tangential sentiment, since a respondent might want to see on the heat map more indications of what the reviewer did not like rather than what the reviewer thought was fine and did not need fixing.

In some cases, instead of a heat map or colors in a grid, relative time spent or review instances might be indicated in other ways, such as a dot map with one dot per small unit of time. For example, the respondent might be presented with an overlay image comprising dots, where there is one dot represented each 0.05 seconds spent at a particular region reviewing. In another example, the reviewer uses a laser pointer and the overlay is an image of the path taken by the laser pointer, with the path wide corresponding to speed of movement (e.g., a fast stroke across the image is thinner than a slow circling of an area of the image).

Multiple Images

In the examples above, usually it was assumed that the reviewer is reviewing one image. A reviewer can, of course, review multiple images independently. In some reviewing systems, a reviewer can review a stack of images, such as an animation sequence. Some review comments can be associated with reviewer indicators that are specific to an individual image, whereas some comments might be associated across images. Then, when the heat maps are presented to the respondent, they can be viewed as individual heat maps or summations over multiple heat maps. In yet more specific variations, instead of just stacking the heat maps and summing (i.e., adding up all the values in each image at grid position $(x_g, y_g)$ and using that to select the $(x_g, y_g)$ grid cell color, perhaps the summation might be for a given object or character, as it moves from frame to frame. This could be done by performing motion estimation between the frames (possibly using conventional motion estimation or drawing this information from underlying animation or geometric models) and then accumulating over objects rather than over fixed grid positions.

Upon replay, the user can have the individual heat maps or make subset selections on a collection of the heat maps, in which case the selection might result in the reviewing system performing the inverse of motion tracking. Thus, if the respondent circles and area of the combined heat map that includes a character X, then the reviewing system would select from each image the reviews of that are within the boundary of character X as it moves from frame to frame rather than only allowing the respondent to select a fixed subset that is the same shape and location on each of the images.

To assist the respondent in the case of multiple images review, the display provided to the respondent might include mosaics, film strips, collages or other image or iconic representation of the multiple images, so that the respondent is provided some relevance to the heat map. Where only one image is reviewed, the heat map can simply be overlaid onto that one image. Where multiple images are reviewed and the heat map applies to a plurality of images, the initial view presented to the respondent might be the first frame or a key frame from the plurality of images, and various heat map elements overlaid thereon, but also including smaller images, such as thumbnails, combined from various of the plurality of images so the respondent gets a sense of which portions of which images are what caused the reviewer to generate "heat" on the heat map.

Navigation

For the basic navigation of a review session, the system provides a common timeline slider control. Playback speed control is also provided so users can increase the playback speed to skim through the review. One navigation feature uses the heat map visualization to guide correlated temporal segments using spatial information, as explained above.

Below is further description of steps to analyze the pointer motion data in order to generate an intuitive and meaningful user interface for navigation.

With heat map as a first level visual guidance for the review navigation, users can use the heat map grid as a connection between spatial data and temporal data. Where there is only one pointer at any given time during the recording, a simple heat map can be used. Where there is more than one, they can be combined or shown separately or at the same time, but distinctly.

Considering each pointer separately, the pointer position will only be in one grid cell at any given time and that pointer position can be captured when the user clicks on the image space during playback. The position is used to locate the grid cell coordinate that it resides in. Since each grid cell will contain a list of recorded pointer motion events that fall into that grid cell, as described above, the playback system can retrieve a list of timestamps from each event data. A small additional interval might be added for each exact timestamp (for example, 0.5 second or one second before and after the exact timestamp, or just before or just after) and then a range "union" operation applied from the first element of the list to the last one, to derive a list of disjoint temporal segments that correspond to that spatial position. This is illustrated on the lower portion of FIG. 4.

The disjoint segments information then can be used to highlight the recording timeline. So whenever a user clicks on a location on the image during playback, the system will highlight related timeline segments that contain user-interactions close to that location. The playback controller will skip segments not highlighted with an audio hint. The user then can have a more intuitive and easy navigation experience in a lengthy review recording session.

Audiovisual Review Example

The image review system might be used for reviewing audio-visual works, such as animated feature films. The system might comprise software running on a device that is network-connected or not, but that has access to the work being reviewed, as well as possibly access to provide messages to other users. Example hardware might be an iPad™ tablet computer or other tablet computer capable of displaying media and accepting input.

A review tool might include ancillary functions and run as part of the image review system. For example, the review tool might organize media files into distinct reviews, so that a reviewer can group commentary. The review tool would allow the reviewer to play media files such as images and movies, with or without audio. The review tool might include playback controls that are more flexible than those typically provided merely for viewing content. For example, controls might be provided that specify variable speed playback, specify selections of frame ranges and/or advance/rewind single frames, as well as other kinds of controls that are useful for critiquing animation.

Using the review tool, the reviewer can provide feedback while viewing the media. The feedback might be audio annotation, drawing/sketching over the images/media and/or text annotations, perhaps in a side window or text box. The feedback can be stored as a data structure linked to the media data structure, but distinct from it. The stored feedback data structure might then be transmitted to the appropriate parties. For example, the image review system might maintain a database or data structure that associates particular network names, e-mail addresses, etc. with various portions of the media and the review tool can then automatically route the feedback data to the appropriate party. Thus, if a portion of a feature film is associated in the database or data structure with a particular creator or artist, when the reviewer completes an annotation, that annotation can appear as a link, e-mail, etc. on the computer of the creator or artist.

The feedback data might include recordings of user gestures from the reviewer as well as synchronized audio on a sequential timeline. Once this feedback data structure has been created and send to the media review destination (e.g., the person to whom the review is directed) might take some corresponding action using a recipient tool portion of the image review system or an independent system.

As an example, the recipient of a feedback data structure might play back the review session sequentially, watching the user gestures of the reviewer and listening to the audio feedback. At appropriate points in the timeline, the reviewer's recorded gestures would manipulate the media exactly as was done during the review session. Drawn overlays and/or audio annotations would be triggered at the correct times.

As another example, the recipient of a feedback data structure might select a gesture (typically drawn markings or text annotations) and have the recipient tool play the appropriate part of the audio annotation. The recipient tool might seeking to a break in the sound track preceding the start timestamp of the gesture and continue the playback from there, past the end timestamp and to the next break. Alternatively, the recipient might select a part of the audio annotation and the recipient tool could play back the subset of gestures associated with that selected time.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An image review system for processing reviewer inputs related to an image, comprising:
    an input for receiving reviewer position indicators, wherein a first reviewer position indicator of the reviewer position indicators corresponds to a first subset region of the image to which a reviewer indicates;
    storage for the reviewer position indicators: wherein the first reviewer position indicator of the reviewer position indicators is stored with a first timestamp representing a review time at which the reviewer indicated the first subset region of the image;
    an input for receiving reviewer commentary data;
    storage for the reviewer commentary data, wherein first reviewer commentary data corresponds to the first subset region of the image associated with the first reviewer position indicator, and wherein the first reviewer commentary data is stored with the first reviewer position indicator and the first timestamp;
    logic for generating a map of aggregated reviewer position indicators, wherein the map, when overlaid on the image, indicates portions of the image commented on by the reviewer at a plurality of review times; and
    a display for displaying the map of aggregated reviewer position indicators, wherein the map of aggregated reviewer position indicators is two dimensional, and wherein the aggregated reviewer position indicators correspond to summations of review activity over a plurality of actions on a plurality of reviewed images, and
    wherein the summations of review activity over the plurality of actions on the plurality of reviewed images comprise summations based on one or more objects' varying positions from image to image, wherein the varying positions correspond to motions of the one or more objects from image to image in the plurality of reviewed images.

2. The image review system of claim 1, wherein displaying the map of aggregated reviewer position indicators comprises generating an overlay image wherein each of a plurality of regions of the overlay image are colored with a color that encodes a number of reviewer position indicators that occur in each of the plurality of regions.

3. A method of processing image review data, comprising:
displaying, by a computer, an image to be reviewed;
recording, by the computer, reviewer commentary data, wherein the reviewer commentary data has associated timestamps;
recording, by the computer, a plurality of reviewer position indicators, wherein a first reviewer position indicator of the reviewer position indicators corresponds to a first subset region of the image to which a reviewer indicates while commenting, and wherein recording the first reviewer position indicator includes storing a first timestamp representing a review time at which the reviewer indicated the first subset region of the image; and
generating, by the computer, a map of aggregated reviewer position indicators, wherein the map, when overlaid on the image, indicates portions of the image commented on by the reviewer at a plurality of review times,
wherein the map of aggregated reviewer position indicators is two dimensional,
wherein the aggregated reviewer position indicators correspond to summations of review activity over a plurality of actions on a plurality of reviewed images, and
wherein the summations of review activity over the plurality of actions on the plurality of reviewed images comprise summations based on one or more objects' varying positions from image to image, wherein the varying positions correspond to motions of the one or more objects from image to image in the plurality of reviewed images.

4. The method of claim 3, further comprising:
receiving user input as to a selected subset region of the image;
identifying a subset of the plurality of reviewer position indicators that have corresponding locations that correspond to the selected subset region of the image;
identifying a subset of the reviewer commentary data that corresponds to the identified subset of the plurality of reviewer position indicators; and
replaying reviewer commentary data that is part of the subset of the reviewer commentary data while omitting reviewer commentary data that is not part of subset of the reviewer commentary data.

5. The method of claim 4, wherein the corresponding locations of the subset of the plurality of reviewer position indicators are each within the selected subset region or within an indicator adjustment range of the selected subset region, and wherein the corresponding locations of the subset of the reviewer commentary data correspond to the identified subset of the plurality of reviewer position indicators by having timestamps that are equal or within a predetermined time difference.

6. The method of claim 5, wherein the predetermined time difference is a fixed time period added to starting and ending times of the subset of the reviewer commentary data that is played.

7. The method of claim 6, wherein the reviewer commentary data includes audio data and replaying the audio data includes playing audible indicators of transitions between reviewer commentary data that is part of the subset of the reviewer commentary data and reviewer commentary data that is not part of subset of the reviewer commentary data that is omitted.

8. The method of claim 4, wherein receiving user input as to the selected subset region of the image comprises presenting a user with a heat map of the plurality of reviewer position indicators and accepting a user selection of portions of the heat map.

9. The method of claim 4, wherein the selected subset region of the image is determined based on detecting a closed curve of nonzero area produced by a user on the image.

10. The method of claim 4, wherein identifying the subset of the reviewer commentary data that corresponds to the identified subset of the plurality of reviewer position indicators includes:
identifying reviewer position indicators that overlap with the selected subset region, wherein the subset of the plurality of reviewer position indicators is not equal to the selected subset region.

11. The method of claim 4, wherein the reviewer commentary data includes a streaming data file, and wherein identifying the subset of the reviewer commentary data that corresponds to the identified subset of the plurality of reviewer position indicators comprises:
filtering, by the computer, disjointed portions from the streaming data file associated with the identified subset of the plurality of reviewer position indicators; and
combining, by the computer, the disjointed portions into a playback file.

12. The method of claim 3, further comprising weighting, by the computer, aggregated reviewer position indicators unequally such that some of the aggregated reviewer position indicators are weighted more heavily than other aggregated reviewer position indicators.

13. The method of claim 12, wherein weights used for aggregated reviewer position indicators correspond to one or more of input device pressure, speed of position movement, reviewer voice volume, and/or reviewer gestures.

14. The method of claim 3, wherein the plurality of reviewer position indicators comprise one or more of points, grid locations, text insert locations, drawing marking locations, and/or an object selection.

15. The method of claim 3, wherein the plurality of reviewer position indicators comprise grid locations from a grid defined by lines on the image that divide the image into rectangular regions each more than one pixel wide and more than one pixel high, such that at least some reviewer position indicators corresponding to different locations on the image are mapped to a same grid location.

16. The method of claim 3, wherein the reviewer commentary data comprises audio having identified playtimes that correspond to at least one timestamp of one of the plurality of reviewer position indicators.

17. The method of claim 3, wherein the reviewer commentary data comprises drawing inputs.

18. The method of claim 3, further comprising:
generating, by the computer, representations of portions of the plurality of images based on portions associated with the aggregated reviewer position indicators; and
indicating, by the computer, associations between the representations and portions of the map of aggregated reviewer position indicators, such that the representations provide an indication of which of the plurality of images and which portions of the plurality of images are associated with various aggregated reviewer position indicators.

19. The method of claim 18, wherein the representations comprise one or more of a mosaic of the portions, a film strip of at least the portions, and a collage of the portions.

* * * * *